United States Patent [19]

Oetjen

[11] Patent Number: 4,586,832
[45] Date of Patent: May 6, 1986

[54] ROLLING BEARING FOR USE WITH SCREWTHREADED SPINDLES

[75] Inventor: Jürgen Oetjen, Herzogenaurach, Fed. Rep. of Germany

[73] Assignee: INA Walzlager Schaeffler KG, Fed. Rep. of Germany

[21] Appl. No.: 688,628

[22] Filed: Jan. 3, 1985

[30] Foreign Application Priority Data

Feb. 29, 1984 [DE] Fed. Rep. of Germany ....... 3407423

[51] Int. Cl.⁴ ............................................. F16C 25/06
[52] U.S. Cl. .................................... 384/455; 384/620
[58] Field of Search ................................. 384/452–455, 384/537, 550, 584, 585, 616, 617, 620, 603, 583, 519; 74/89.15, 424.8 R, 424.8 A, 424.8 B

[56] References Cited

U.S. PATENT DOCUMENTS

| | | | |
|---|---|---|---|
| 518,321 | 4/1894 | La Casse | 384/616 |
| 1,156,320 | 10/1915 | Scuterud | 384/616 |
| 2,052,108 | 8/1936 | Okner et al. | 384/541 |
| 2,556,572 | 6/1951 | Brinkhurst | 74/424.8 A |
| 3,226,169 | 12/1965 | Housel et al. | 384/620 |
| 3,730,016 | 5/1973 | Miller | 74/424.8 B |

Primary Examiner—Stuart S. Levy
Assistant Examiner—David Werner
Attorney, Agent, or Firm—Bierman, Peroff & Muserlian

[57] ABSTRACT

A rolling bearing for use with a screwthreaded spindle comprising a relatively thick-walled outer race ring and an inner race ring, rolling members rolling between the two rings, rings of rolling members rolling between the two end faces of the outer race ring and end plates disposed at a distance from the latter faces and connected to the spindle, the end plates being adjustably mounted on the spindle whereby their relative preloading can be adjusted, characterized in that the two end plates have in their bores an internal screwthread corresponding to the screwthread of the spindle and therefore themselves serve for securing and axially adjusting the bearing on the spindle.

5 Claims, 1 Drawing Figure

U.S. Patent  May 6, 1986  4,586,832
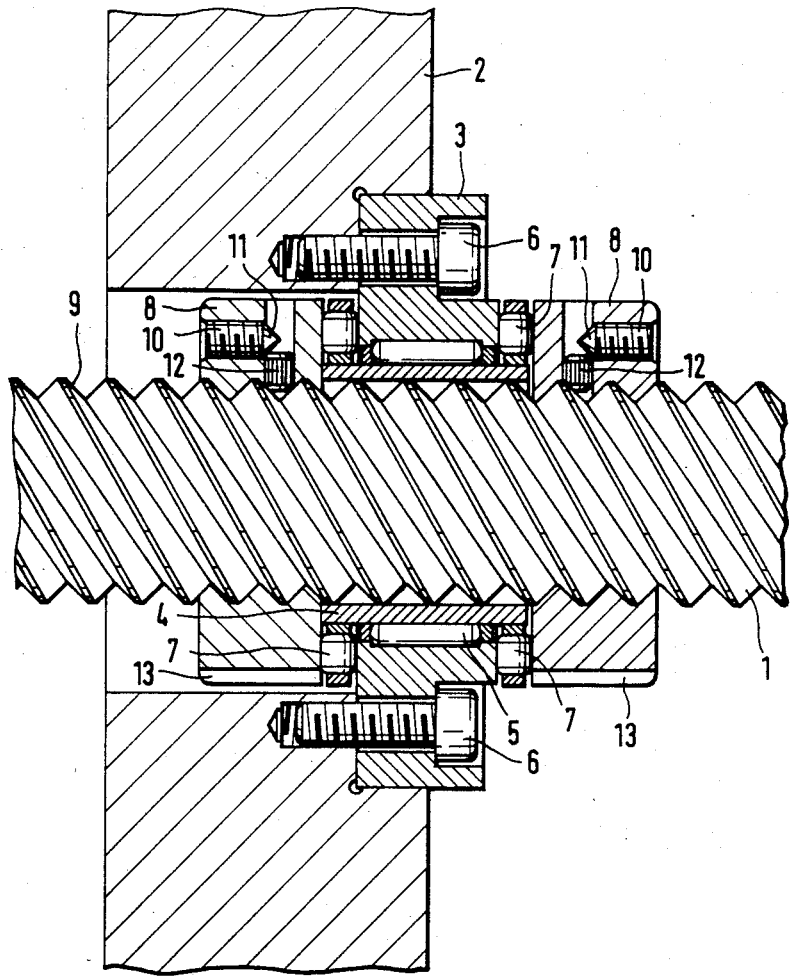

ROLLING BEARING FOR USE WITH SCREWTHREADED SPINDLES

STATE OF THE ART

Known rolling bearings for use with a screwthreaded spindle comprising a relatively thick-walled outer race ring and an inner race ring, preferably cylindrical rolling members rolling between the two rings, rings of rolling members rolling between, on the one hand, the two end faces of the outer race ring and, on the other hand, end plates disposed at a distance from the latter faces and connected to the spindle, the end plates being adjustably mounted on the spindle so that their relative preloading can be adjusted are conventionally disposed at the ends of screwthreaded spindles on shoulders which continue the spindle screwthreading. As a rule, one end plate bears on the shoulder and the second end plate is adjusted for preloading by a screwthreaded nut which bears on the latter end plate and which engages a special screwthread on the spindle shoulder. If a rolling bearing of this kind is also to be able to serve for aligning or straightening the spindle lengthwise, the second end plate must also bear on an adjusting nut. This known kind of mounting is very expensive because of the need to machine the spindle end and because of the additional nuts.

OBJECTS OF THE INVENTION

It is an object of the invention to provide a rolling bearing for screwthreaded spindles which, without loss of quality, can be secured to the spindle much more simply and, therefore, at lower cost.

This and other objects and advantages of the invention will become obvious from the following detailed description.

THE INVENTION

A rolling bearing for use with a screwthreaded spindle comprising a relatively thick-walled outer race ring and an inner race ring, rolling members rolling between the two rings, rings of rolling members rolling between the two end faces of the outer race ring and end plates disposed at a distance from the latter faces and connected to the spindle, the end plates being adjustably mounted on the spindle whereby their relative preloading can be adjusted, is characterized in that the two end plates have in their bores and internal screwthread corresponding to the screwthread of the spindle and therefore themselves serve for securing and axially adjusting the bearing on the spindle.

According to the invention, therefore, the two end plates have in their bores an internal screwthread corresponding to the screwthread of the spindle which themselves serve for securing and axially adjusting the bearing on the spindle. This feature obviates all additional machining of the spindle, since the screwthread thereof itself serves for securing the bearing. Also, no additional securing elements such as screw-threaded nuts or the like are necessary, since securing is provided by the end plates themselves.

The inner race ring of the bearing does not need to have an internal screwthread and instead, it can engage directly by way of its smooth cylindrical bore surface with the crests of the screwthreading.

The axial length of the inner race ring can also be such that, upon the required bearing preloading being reached, the two end plates bear on the end faces of such ring. Also, the two end plates can be secured against rotation by conventional means, particularly by adjusting screws or securing pins or the like.

Referring now to the drawing:

An embodiment of the invention is shown in longitudinal section in the drawing. A screwthreaded spindle 1 is mounted in a casing 2 by a rolling bearing comprising an outer race ring 3 and an inner race ring 4, cylindrical rolling members 5 rolling between the two rings 3 and 4. Screws 6 secure the outer ring 3 to the casing 2. Rings of cylindrical rolling members 7 roll on the two end faces of the outer ring 3 and the raceways on the other side carry end plates 8 which are screwed by internal screwthreading in their bore on spindle screwthread 9.

Consequently, by screwing the end plates 8 on the screwthread 9 to different extents, the rolling bearing can be moved to a definite location on the spindle 1 and can have the required axial preloading applied to it in this position by screwing the two end plates 8 in opposite directions. The end plates 8 can then be secured against rotation by appropriate means in the position thus reached. In the example shown, the latter securing is by means of grub screws 10 which act by a cone 11 on radially operative securing pins 12 profiled at their ends to match the spindle screwthreading. In some parts of the periphery, the plates 8 are formed with longitudinal grooves 13 to enable a tool to be engaged.

Various modifications of the bearing of the invention may be made without departing from the spirit or scope thereof and it should be understood that the invention is intended to be limited only as defined in the appended claims.

What I claimed is:

1. A rolling bearing comprising: a screw threaded spindle (1), a relatively thick-walled outer race ring (3) secured to a casing (2), said outer race ring having two end faces, an inner race ring (4), rolling members (5) rolling between the two rings, rings of rolling members (7) rolling between the two end faces of the outer race ring (3) and two end plates (8) disposed at a distance from the end faces of the outer race ring and connected to the spindle, said end plates having internal bores therein, the end plates being adjustably mounted on the spindle whereby the preloading of the bearing can be adjusted, characterized in that the two end plates (8) have in their bores an internal screw thread (9) corresponding to the screw thread of the spindle (1), said end plates serve for securing and axially adjusting the bearing on the spindle.

2. A bearing of claim 1 wherein said inner race ring has an internal bore surface, said internal bore surface of the inner race ring is disposed directly on the crests of the screwthreading.

3. A bearing of claim 1 wherein the axial length of the inner race ring is such that upon the required bearing preloading being reached, the two end plates bear on the end faces of such ring.

4. A bearing of claim 2 wherein the axial length of the inner race ring is such that upon the required bearing preloading being reached, the two end plates bear on the end faces of such ring.

5. A bearing of claim 1 wherein the rolling members are cylindrical rollers.

* * * * *